US012018591B2

(12) United States Patent
Harrington et al.

(10) Patent No.: US 12,018,591 B2
(45) Date of Patent: Jun. 25, 2024

(54) RING SEGMENT ASSEMBLY IN GAS TURBINE ENGINE

(71) Applicant: Siemens Energy Global GmbH & Co. KG, Munich (DE)

(72) Inventors: John Harrington, Orlando, FL (US); Jose L. Rodriguez, Longwood, FL (US); Jesus Velez-Quinones, Jupiter, FL (US)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 18/304,415

(22) Filed: Apr. 21, 2023

(65) Prior Publication Data

US 2023/0366320 A1 Nov. 16, 2023

Related U.S. Application Data

(60) Provisional application No. 63/364,688, filed on May 13, 2022.

(51) Int. Cl.
*F01D 9/04* (2006.01)

(52) U.S. Cl.
CPC .......... *F01D 9/04* (2013.01); *F05D 2260/201* (2013.01); *F05D 2260/22141* (2013.01)

(58) Field of Classification Search
CPC ............... F01D 9/04; F01D 11/08–127; F01D 11/25–12; F01D 25/12; F05B 2260/201; F05B 2260/22141
See application file for complete search history.

(56) References Cited

U.S. PATENT DOCUMENTS

| | | | | |
|---|---|---|---|---|
| 6,439,846 | B1 * | 8/2002 | Anderson | F01D 5/187 416/96 A |
| 7,972,106 | B2 | 7/2011 | Bigi et al. | |
| 10,352,566 | B2 * | 7/2019 | Drake | F23R 3/002 |
| 10,603,866 | B2 | 3/2020 | Bertoldi et al. | |
| 10,611,118 | B2 | 4/2020 | Bertoldi et al. | |
| 10,690,055 | B2 * | 6/2020 | Stover | F02C 7/18 |
| 10,711,794 | B2 * | 7/2020 | Propheter-Hinckley | F01D 5/28 |
| 10,830,102 | B2 * | 11/2020 | Martin | B22F 5/009 |
| 11,131,199 | B2 * | 9/2021 | Romanov | F01D 5/186 |
| 11,454,137 | B1 * | 9/2022 | Chong | F01D 25/14 |
| 2005/0150632 | A1 | 7/2005 | Mayer et al. | |

(Continued)

FOREIGN PATENT DOCUMENTS

| | | | |
|---|---|---|---|
| JP | 5804741 | B2 | 11/2015 |
| WO | 2016112364 | A1 | 7/2016 |
| WO | 2020236169 | A1 | 11/2020 |

*Primary Examiner* — Sang K Kim

(57) ABSTRACT

A ring segment assembly includes a ring segment including an impingement pocket having an impingement surface, a plurality of pins extending from the impingement surface, and an impingement plate spaced a non-zero distance from the impingement surface. The plurality of pins are arranged to define a plurality of pinless impingement areas. The impingement plate has a plurality of bumps and a plurality of valleys. The impingement plate defines a plurality of impingement holes. Each impingement hole of the plurality of impingement holes is formed in one of the valleys of the plurality of valleys and positioned opposite one of the plurality of pinless impingement areas.

19 Claims, 4 Drawing Sheets

(56) References Cited

U.S. PATENT DOCUMENTS

| | | | | |
|---|---|---|---|---|
| 2008/0211192 | A1* | 9/2008 | Pietraszkiewicz | F01D 11/08 277/347 |
| 2012/0272521 | A1 | 11/2012 | Lee et al. | |
| 2017/0101932 | A1 | 4/2017 | Stover et al. | |
| 2018/0066539 | A1 | 3/2018 | Romanov | |
| 2020/0095887 | A1 | 3/2020 | Romanov | |
| 2022/0127963 | A1* | 4/2022 | Lee | F23R 3/005 |

* cited by examiner

RING SEGMENT ASSEMBLY IN GAS TURBINE ENGINE

BACKGROUND

A gas turbine engine typically includes a compressor section, a turbine section, and a combustion section disposed therebetween. The compressor section includes multiple stages of rotating compressor blades and stationary compressor vanes. The combustion section typically includes a plurality of combustors. The turbine section includes multiple stages of rotating turbine blades and stationary turbine vanes. Turbine blades and vanes often operate in a high temperature environment and are internally cooled. The combustor may include fuel injectors for providing a fuel to be mixed with compressed air from the compressor section and an ignition source for igniting the mixture to form hot exhaust gas for the turbine section.

BRIEF SUMMARY

In one aspect, a ring segment assembly includes a ring segment including an impingement pocket having an impingement surface, a plurality of pins extending from the impingement surface, the plurality of pins are arranged to define a plurality of pinless impingement areas, and an impingement plate spaced a non-zero distance from the impingement surface, the impingement plate having a plurality of bumps and a plurality of valleys, the impingement plate defining a plurality of impingement holes, each impingement hole of the plurality of impingement holes formed in one of the valleys of the plurality of valleys and positioned opposite one of the plurality of pinless impingement areas.

In one aspect, a ring segment assembly includes a ring segment including an impingement pocket having an impingement surface, a plurality of pins extending from the impingement surface, and an impingement plate spaced a non-zero distance from the impingement surface, the impingement plate having a plurality of bumps and a plurality of valleys arranged in an array having a plurality of rows and a plurality of columns, each bump of the plurality of bumps and each valley of the plurality of valleys alternating with each other in each row of the plurality of rows and each column of the plurality of columns, the impingement plate defining a plurality of impingement holes, each impingement hole of the plurality of impingement holes formed in one of the valleys of the plurality of valleys.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
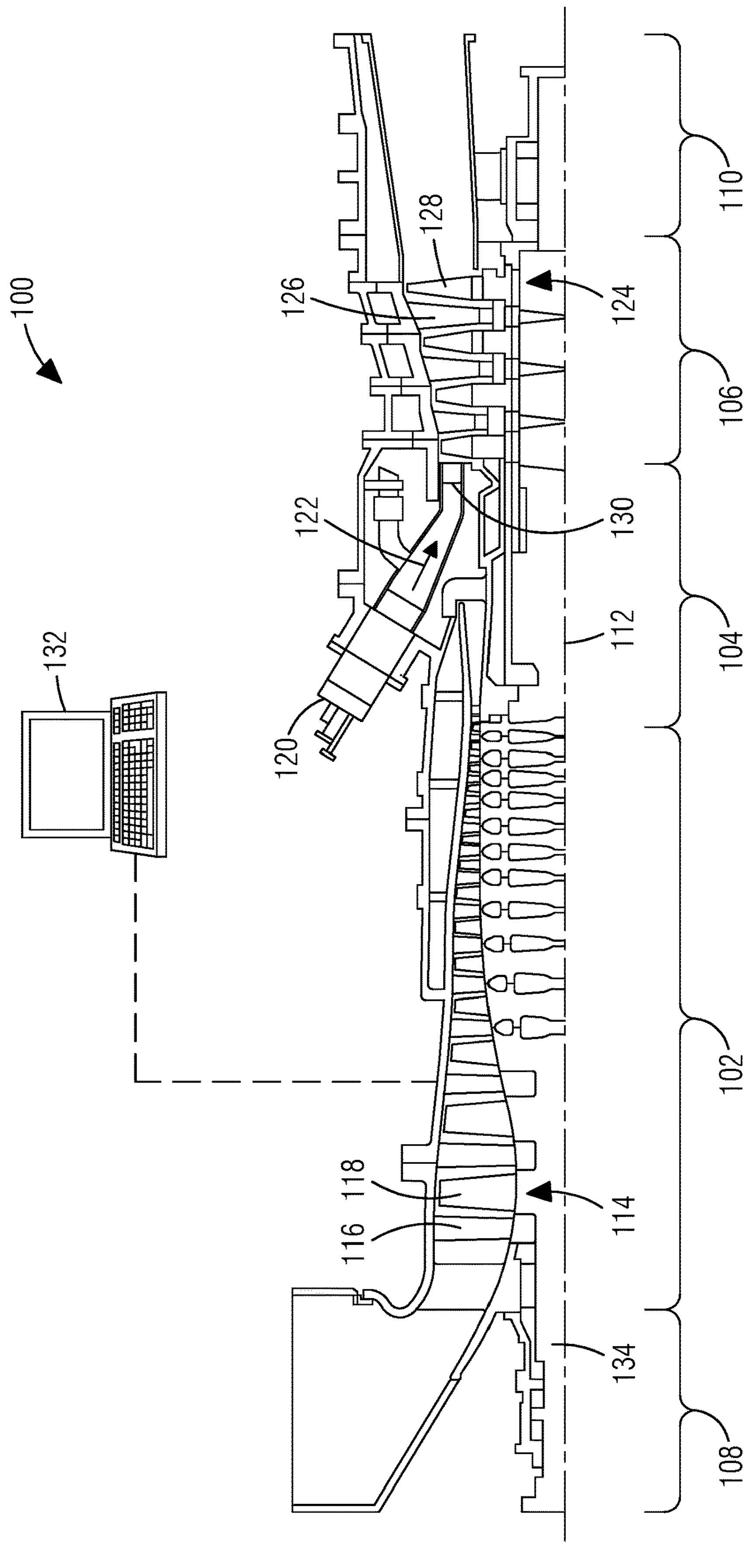
FIG. 1 is a longitudinal cross-sectional view of a gas turbine engine 100 taken along a plane that contains a longitudinal axis or central axis.

Before any embodiments of the invention are explained in detail, it is to be understood that the invention is not limited in its application to the details of construction and the arrangement of components set forth in this description or illustrated in the following drawings. The invention is capable of other embodiments and of being practiced or of being carried out in various ways. Also, it is to be understood that the phraseology and terminology used herein is for the purpose of description and should not be regarded as limiting.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Also, it should be understood that the words or phrases used herein should be construed broadly, unless expressly limited in some examples. For example, the terms “including”, “having”, and “comprising”, as well as derivatives thereof, mean inclusion without limitation. The singular forms “a”, “an”, and “the” are intended to include the plural forms as well, unless the context clearly indicates otherwise. Further, the term “and/or” as used herein refers to and encompasses any and all possible combinations of one or more of the associated listed items. The term “or” is inclusive, meaning and/or, unless the context clearly indicates otherwise. The phrases “associated with” and “associated therewith” as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Furthermore, while multiple embodiments or constructions may be described herein, any features, methods, steps, components, etc. described with regard to one embodiment are equally applicable to other embodiments absent a specific statement to the contrary.

Also, although the terms “first”, “second”, “third” and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

Also, in the description, the terms "axial" or "axially" refer to a direction along a longitudinal axis of a gas turbine engine. The terms "radial" or "radially" refer to a direction perpendicular to the longitudinal axis of the gas turbine engine. The terms "downstream" or "aft" refer to a direction along a flow direction. The terms "upstream" or "forward" refer to a direction against the flow direction.

In addition, the term "adjacent to" may mean that an element is relatively near to but not in contact with a further element or that the element is in contact with the further portion, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard is available, a variation of twenty percent would fall within the meaning of these terms unless otherwise stated.

FIG. 1 illustrates an example of a gas turbine engine 100 including a compressor section 102, a combustion section 104, and a turbine section 106 arranged along a central axis 112. The compressor section 102 includes a plurality of compressor stages 114 with each compressor stage 114 including a set of stationary vanes 116 or adjustable guide vanes and a set of rotating blades 118. A rotor 134 supports the rotating blades 118 for rotation about the central axis 112 during operation. In some constructions, a single one-piece rotor 134 extends the length of the gas turbine engine 100 and is supported for rotation by a bearing at either end. In other constructions, the rotor 134 is assembled from several separate spools that are attached to one another or may include multiple disk sections that are attached via a bolt or plurality of bolts.

The compressor section 102 is in fluid communication with an inlet section 108 to allow the gas turbine engine 100 to draw atmospheric air into the compressor section 102. During operation of the gas turbine engine 100, the compressor section 102 draws in atmospheric air and compresses that air for delivery to the combustion section 104. The illustrated compressor section 102 is an example of one compressor section 102 with other arrangements and designs being possible.

In the illustrated construction, the combustion section 104 includes a plurality of separate combustors 120 that each operate to mix a flow of fuel with the compressed air from the compressor section 102 and to combust that air-fuel mixture to produce a flow of high temperature, high pressure combustion gases or exhaust gas 122. Of course, many other arrangements of the combustion section 104 are possible.

The turbine section 106 includes a plurality of turbine stages 124 with each turbine stage 124 including a number of stationary turbine vanes 126 and a number of rotating turbine blades 128. The turbine stages 124 are arranged to receive the exhaust gas 122 from the combustion section 104 at a turbine inlet 130 and expand that gas to convert thermal and pressure energy into rotating or mechanical work. The turbine section 106 is connected to the compressor section 102 to drive the compressor section 102. For gas turbine engines 100 used for power generation or as prime movers, the turbine section 106 is also connected to a generator, pump, or other device to be driven. As with the compressor section 102, other designs and arrangements of the turbine section 106 are possible.

An exhaust portion 110 is positioned downstream of the turbine section 106 and is arranged to receive the expanded flow of exhaust gas 122 from the final turbine stage 124 in the turbine section 106. The exhaust portion 110 is arranged to efficiently direct the exhaust gas 122 away from the turbine section 106 to assure efficient operation of the turbine section 106. Many variations and design differences are possible in the exhaust portion 110. As such, the illustrated exhaust portion 110 is but one example of those variations.

A control system 132 is coupled to the gas turbine engine 100 and operates to monitor various operating parameters and to control various operations of the gas turbine engine 100. In preferred constructions the control system 132 is typically micro-processor based and includes memory devices and data storage devices for collecting, analyzing, and storing data. In addition, the control system 132 provides output data to various devices including monitors, printers, indicators, and the like that allow users to interface with the control system 132 to provide inputs or adjustments. In the example of a power generation system, a user may input a power output set point and the control system 132 may adjust the various control inputs to achieve that power output in an efficient manner.

The control system 132 can control various operating parameters including, but not limited to variable inlet guide vane positions, fuel flow rates and pressures, engine speed, valve positions, generator load, and generator excitation. Of course, other applications may have fewer or more controllable devices. The control system 132 also monitors various parameters to assure that the gas turbine engine 100 is operating properly. Some parameters that are monitored may include inlet air temperature, compressor outlet temperature and pressure, combustor outlet temperature, fuel flow rate, generator power output, bearing temperature, and the like. Many of these measurements are displayed for the user and are logged for later review should such a review be necessary.

Figure 2:
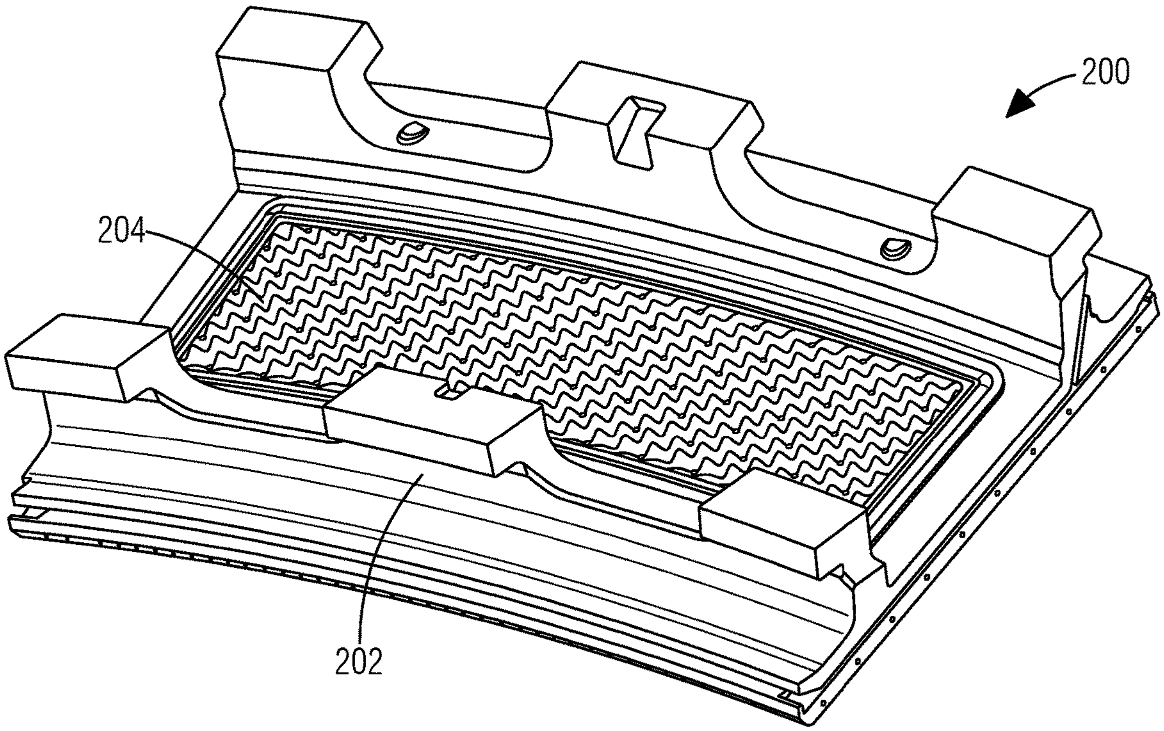
FIG. 2 illustrates a perspective view of a ring segment assembly that is used in FIG. 1.

FIG. 2 illustrates a perspective view of a ring segment assembly 200 that is used in the gas turbine engine 100 in FIG. 1. The ring segment assembly 200 is disposed adjacent to a tip of the rotating turbine blade 128 with a gap therebetween. A plurality of ring segment assemblies 200 are arranged circumferentially and are disposed around the plurality of rotating turbine blades 128 in the gas turbine engine 100.

The ring segment assembly 200 includes a ring segment 202 and an impingement plate 204 that is fixedly connected to the ring segment 202. The ring segment 202 may be welded to the ring segment 202. Other connecting methods may also be used to connect the impingement plate 204 to the ring segment 202.

Figure 3:
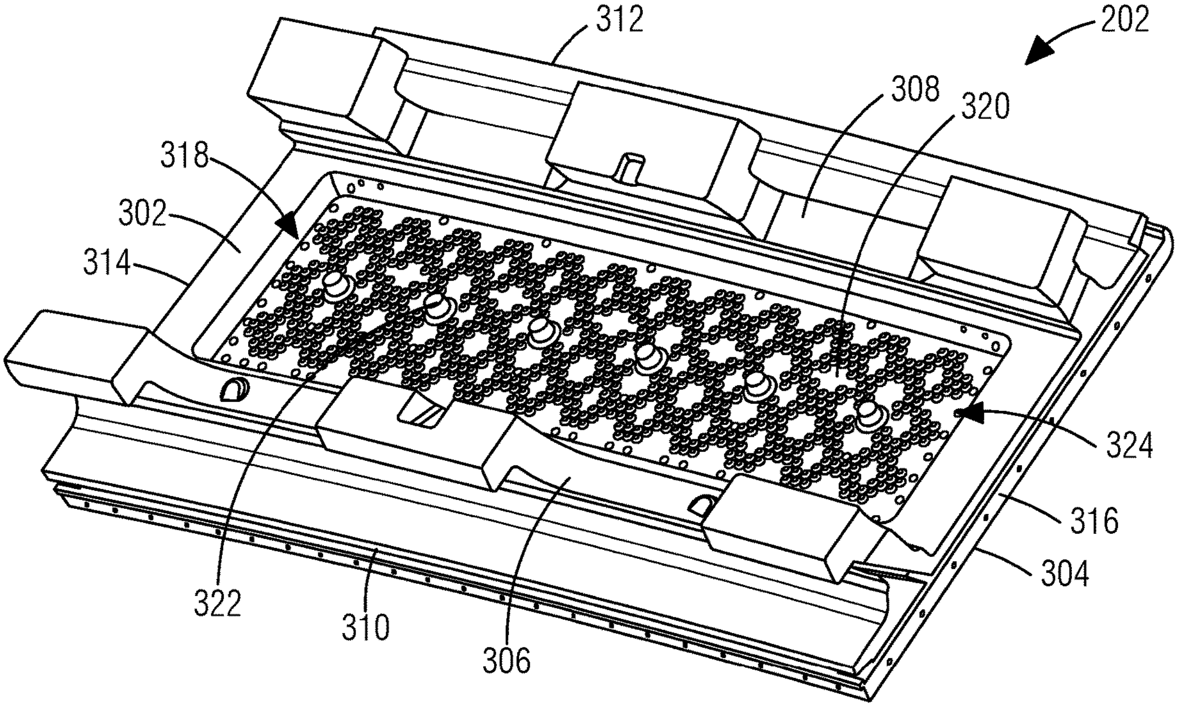
FIG. 3 illustrates a perspective view of a ring segment in FIG. 2.

FIG. 3 illustrates a perspective view of the ring segment 202 shown in FIG. 2. The ring segment 202 has a generally rectangular shape and a curved shape in a circumferential direction. The ring segment 202 has a first side 302 that is facing away from the rotating turbine blade 128 and a second side 304 that is opposite to the first side 302 and facing toward the rotating turbine blade 128. The ring segment 202 has a forward side 310 and an aft side 312 with respect to a flow direction of the exhaust gas 122. The ring segment 202 has a first mate face side 314 and a second mate face side 316 each facing to an adjacent ring segment assembly 200. The ring segment 202 has a forward rail 306 that extends from the first side 302 in a radial direction and along the forward side 310 in a circumferential direction. The ring segment 202 has an aft rail 308 that extends from the first side 302 in the radial direction and along the aft side 312 in the circumferential direction.

The ring segment 202 includes an impingement pocket 318 that is defined between the forward rail 306, the aft rail 308, the first mate face side 314, and the second mate face side 316. The impingement pocket 318 has an opening on the first side 302 that is covered by the impingement plate 204 (shown in FIG. 2) when assembled to form the ring segment assembly 200. The impingement pocket 318 has a generally rectangular shape and a curved shape along the circumferential direction. The impingement pocket 318 has an impingement surface 320. A plurality of struts 322 extend out from the impingement surface 320 in the radial direction. The struts 322 may have a cylindrical shape, a conical shape, a cubical shape, etc. A plurality of cooling holes 324 are arranged along edges of the impingement pocket 318.

Figure 4:
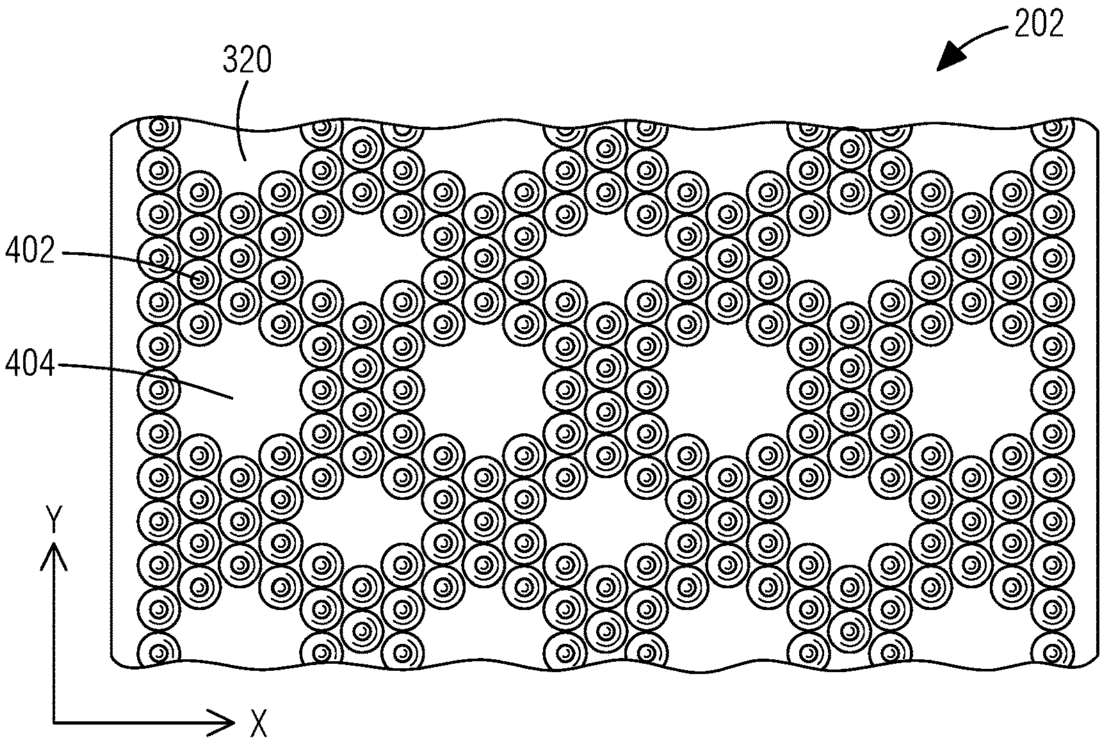
FIG. 4 illustrates a top view of a portion of the ring segment in FIG. 2.

FIG. 4 illustrates a top view of a portion of the ring segment 202 shown in FIG. 2. The ring segment 202 includes a plurality of pins 402 that extends radially from the impingement surface 320. The plurality of pins 402 are arranged in an array having a plurality of rows along an X direction and a plurality of columns along a Y direction. The plurality of pins 402 in adjacent rows and columns are offset with one another defining a staggered arrangement. Specifically, the illustrated construction includes pins 402 in adjacent rows or columns that are located such that each pin 402 in a row or column is offset ½ the distance between two pins 402 in the adjacent rows or columns. In other constructions, the plurality of pins 402 may be only offset with one another in adjacent rows or columns, or aligned with one another in rows and/or columns. In addition, other arrangements are possible.

The plurality of pins 402 are arranged to form a plurality of pinless impingement areas 404 on the impingement surface 320. Each pinless impingement area 404 of the plurality of pinless impingement areas 404 is an area on the impingement surface 320 that includes no pins 402. Edges of each pinless impingement area 404 of the plurality of pinless impingement areas 404 are formed by a number of pins 402.

The plurality of pinless impingement areas 404 are arranged in rows along the X direction and in columns along the Y direction. At least one pin 402 is placed between two adjacent pinless impingement areas 404 in the rows. At least one pin 402 is placed between two adjacent pinless impingement areas 404 in the columns. A portion of the pinless impingement areas 404 has a hexagonal shape that is defined by the arrangement of pins 402 that surround the pinless impingement area 404. A remaining portion of the pinless impingement areas 404 has a parallelogram shape that is also defined by the arrangement of pins 402 that surround the pinless impingement area 404. The pinless impingement areas 404 have the same shape in the same rows and/or in the same columns. The pinless impingement areas 404 having the hexagonal shape reside in common rows and columns as do the parallelogram shaped pinless impingement areas 404. The rows and columns alternate and the pinless impingement areas 404 of adjacent rows and columns are offset from one another in a manner similar to that described with regard to the rows and columns of pins 402. In other constructions, the pinless impingement areas 404 may have any other different shapes, or arranged in any other different ways.

Figure 5:
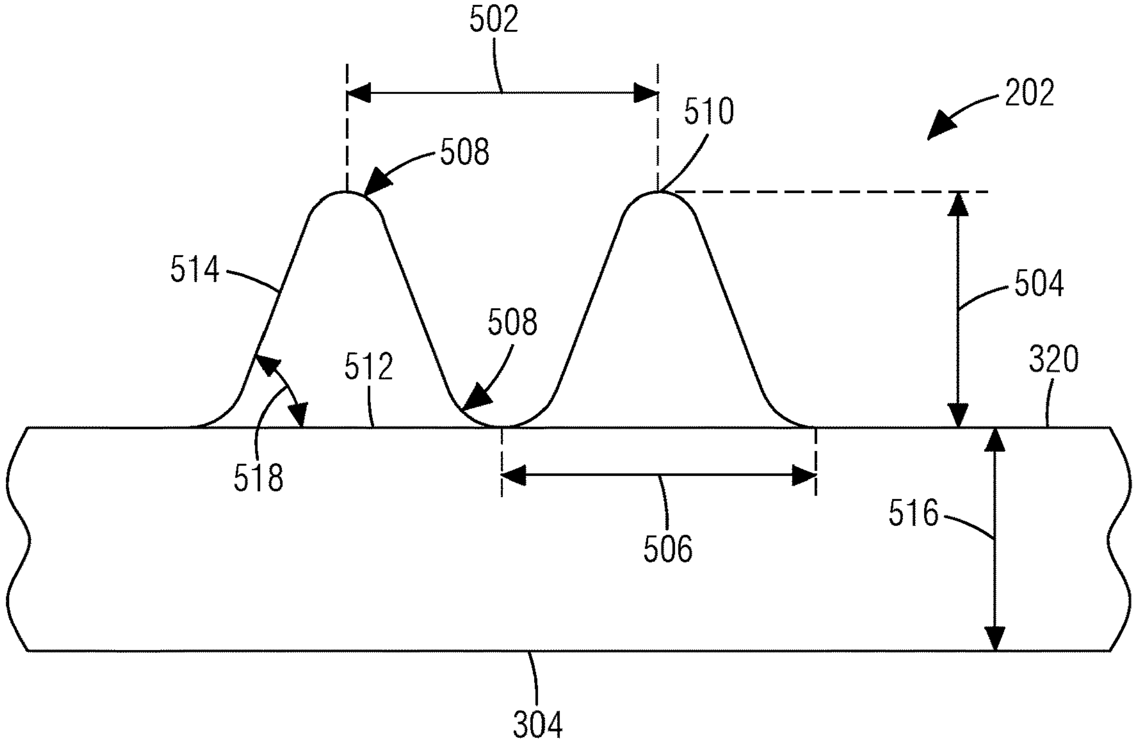
FIG. 5 illustrates a section view of the ring segment in FIG. 2 that better illustrates the pins.

FIG. 5 is a section view of the ring segment 202 in FIG. 2 that better illustrates the pins 402. Each pin 402 of the plurality of pins 402 is solid and has a generally conical shape having a pin tip 510 and a pin bottom 512. The pin bottom 512 is attached to the impingement surface 320 with the pin tip 510 located opposite to the pin bottom 512. The pin tip 510 and the space between adjacent pins 402 are rounded. In the illustrated arrangement, the pin tip 510 and the space between adjacent pins 402 have the same radius 508. The radius 508 is greater than or equal to 0.5 mm. The pin 402 is tapered from the pin bottom 512 to the pin tip 510 having a pin side wall 514 therebetween. The pin side wall 514 is conical having an angle 518 with respect to the pin bottom 512. The angle 518 is less than or equal to 85°. A largest pin width 506 is defined at the pin bottom 512. The largest pin width 506 is greater than or equal to 1 mm. A pin height 504 is defined from the pin bottom 512 to the pin tip 510. A ration of the pin height 504 to the largest pin width 506 is less than or equal to 2. The pins 402 are arranged having a pin distance 502 between centers of two adjacent pins 402 in rows and columns. A ratio of the pin distance 502 to the largest pin width 506 is greater than or equal to 2. The ring segment 202 has a ring segment thickness 516 that is defined between the second side 304 and the impingement surface 320. A ratio of the ring segment thickness 516 to the pin height 504 is greater than or equal to 1.25.

The foregoing dimensions illustrate some possible arrangements of the pins 402 with other constructions being possible. In other constructions, the pins 402 may have different dimensions.

Figure 6:
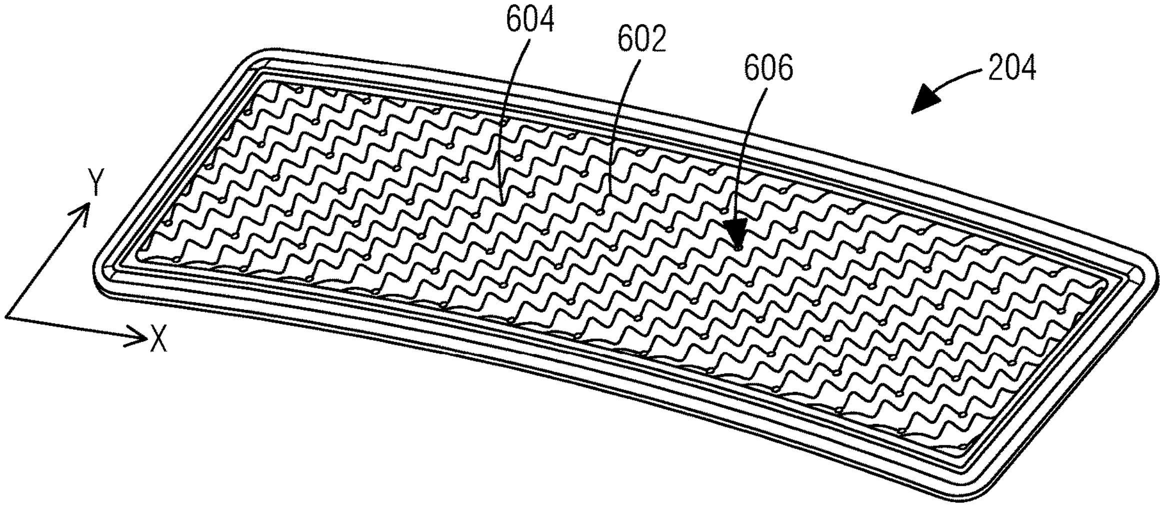
FIG. 6 illustrates a perspective view of an impingement plate in FIG. 2.

FIG. 6 illustrates a perspective view of the impingement plate 204 shown in FIG. 2. The impingement plate 204 has a generally rectangular shape and a curved shape in the circumferential direction.

The impingement plate 204 includes a plurality of bumps 602 and a plurality of valleys 604. The plurality of valleys 604 extend out from the impingement plate 204 toward the impingement surface 320 of the impingement pocket 318. The plurality of bumps 602 extend from the impingement plate 204 in an opposite direction from the plurality of valleys 604. The plurality of bumps 602 and the plurality of valleys 604 are arranged in an array having a plurality of rows along the X direction and a plurality of columns along the Y direction. The plurality of bumps 602 and the plurality of valleys 604 alternate to each other in each row of the plurality of rows and in each column of the plurality of columns. The plurality of bumps 602 and the plurality of valleys 604 are offset in each row and column defining a staggered arrangement. The plurality of bumps 602 and the plurality of valleys 604 provide a negative Poisson's Ratio structure to the impingement plate 204. Poisson's ratio is a measure of Poisson effect in which a material expands in a direction perpendicular to a direction of compression. The material that characterizes this behavior is defined as having a positive Poisson's Ration structure. On the other hand, a material with a negative Poisson's Ratio structure expands in a direction perpendicular to a direction of expansion. The material with negative Poisson's Ratio structure also contracts in a direction perpendicular to a direction of compression.

The impingement plate 204 includes a plurality of impingement holes 606. Each impingement hole 606 of the plurality of impingement holes 606 is formed in an associated valley 604 of the plurality of valleys 604.

Figure 7:
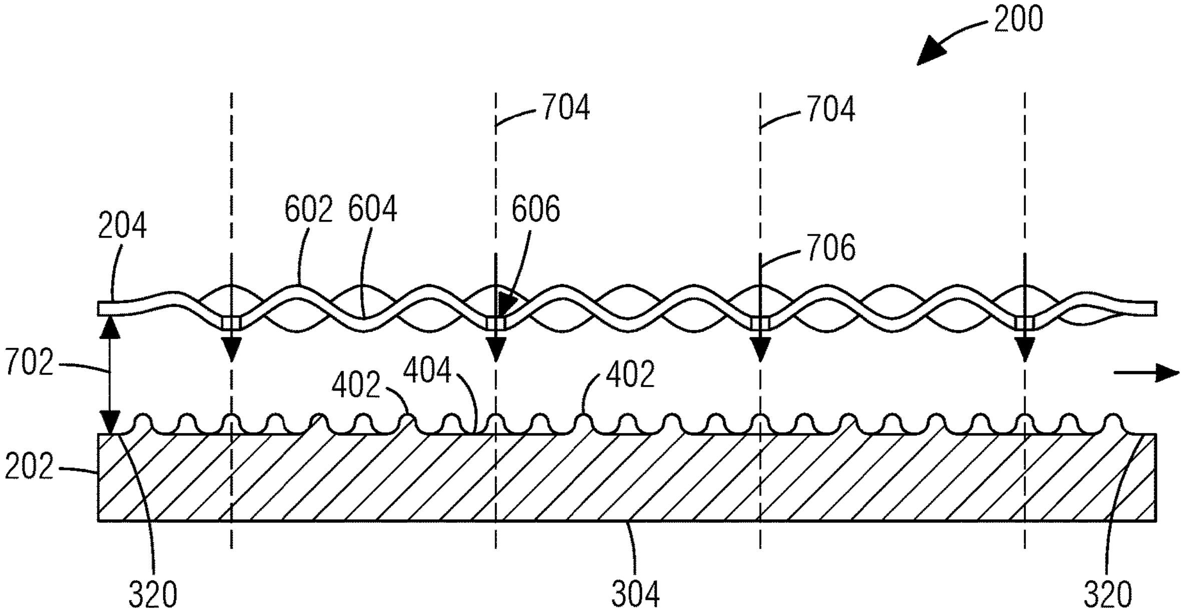
FIG. 7 illustrates a section view of the ring segment assembly in FIG. 2.

FIG. 7 illustrates a section view of the ring segment assembly 200 in FIG. 2. The impingement plate 204 is fixedly connected to the ring segment 202 and covers the impingement pocket 318. The impingement plate 204 is spaced from the impingement surface 320 of the impingement pocket 318 with a non-zero distance 702. The plurality of struts 322 (shown in FIG. 3) extend between and in contact with the impingement surface 320 and the impingement plate 204 to support the impingement plate 204 and maintain the non-zero distance 702 therebetween.

The plurality of impingement holes 606 are formed in every other row and every other column of the plurality of valleys 604. Each impingement hole 606 is formed in an associated valley 604 at a position that is closest to the impingement surface 320. Each impingement hole 606 is positioned opposite to and associated with one pinless impingement area 404. Each impingement hole 606 defines a central axis 704 that is normal to the impingement surface 320 and passes through the associate pinless impingement area 404. In the illustrated construction, the central axis 704 passes through a center of the associate pinless impingement area 404. In other constructions, the central axis 704 may pass through the associated pinless impingement area 404 offset from the center.

In operation, a cooling flow 706 passes through each impingement hole 606 and impinges on each pinless impingement area 404 on the impingement surface 320. The cooling flow 706 travels the shortest distance from the impingement plate 204 to the impingement surface 320 which enhances heat transfer. The pinless impingement areas 404 allows undisturbed impingement on the pinless impingement areas 404 from the cooling flow 706. The undisturbed impingement improves heat transfer at the pinless impingement areas 404. The cooling flow 706 is disturbed by the plurality of pins 402. The pins 402 create turbulent flow which improves heat transfer coefficient and increase heat transfer areas. The enhanced heat transfer reduces requirement of the cooling flow 706 and thus improves performance of the gas turbine engine 100. The cooling flow 706 exits the impingement pocket 318 through the plurality of the cooling holes 324 arranged at the edges of the impingement pocket 318. The ring segment 202 with the pins 402 can be manufactured by conventional casting techniques, or by other techniques such as, by Selective Laser Melting (SLM) printing, or by Electrical Discharge Machining (EDM), etc.

The impingement plate 204 is fixedly connected to the ring segment 202 to cover the impingement pocket 318. The impingement plate 204 is welded around edges of the impingement pocket 318. The impingement plate 204 has a negative Poisson's Ratio structure that is provided by the bumps 602 and valleys 604. The negative Poisson's Ratio structure allows the impingement plate 204 to expand in two directions under a tension which reduces stress at the welding area. The fixed connection of the impingement plate 204 to the ring segment 202 reduces leakage of the cooling flow 706 in the impingement pocket 318 which improves cooling effect.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

LISTING OF DRAWING ELEMENTS

100: gas turbine engine
102: compressor section
104: combustion section
106: turbine section
108: inlet section
110: exhaust portion
112: central axis
114: compressor stage
116: stationary vane
118: rotating blade
120: combustor
122: exhaust gas
124: turbine stage
126: stationary turbine vane
128: rotating turbine blade
130: turbine inlet
132: control system
134: rotor
200: ring segment assembly
202: ring segment
204: impingement plate
302: first side
304: second side
306: forward rail
308: aft rail
310: forward side
312: aft side
314: first mate face side
316: second mate face side
318: impingement pocket
320: impingement surface
322: strut
324: cooling hole
402: pin
404: pinless impingement area
502: pin distance
504: pin height
506: largest pin width
508: radius
510: pin tip
512: pin bottom
514: pin side wall
516: ring segment thickness
518: angle
602: bump
604: valley
606: impingement hole
702: non-zero distance
704: central axis
706: cooling flow

What is claimed is:

1. A ring segment assembly comprising:

a ring segment comprising an impingement pocket having an impingement surface;

a plurality of pins extending from the impingement surface, the plurality of pins are arranged to define a plurality of pinless impingement areas; and an impingement plate spaced a non-zero distance from the impingement surface, the impingement plate having a plurality of bumps and a plurality of valleys, the impingement plate defining a plurality of impingement holes, each impingement hole of the plurality of impingement holes formed in one of the valleys of the plurality of valleys and positioned opposite one of the plurality of pinless impingement areas, wherein the impingement plate comprises a negative Poisson's Ratio structure and is fixedly connected to the ring segment.

2. The ring segment assembly of claim 1, wherein a portion of the plurality of pinless impingement areas comprises a hexagonal shape, and wherein a remaining portion of the plurality of pinless impingement areas has a parallelogram shape.

3. The ring segment assembly of claim 2, wherein the plurality of pinless impingement areas are arranged in an array having a plurality of rows and a plurality of columns, and wherein the plurality of pinless impingement areas having the hexagonal shape alternate with the plurality of pinless impingement areas having the parallelogram shape in each row of the plurality of rows and each column of the plurality of columns.

4. The ring segment assembly of claim 1, wherein each impingement hole of the plurality impingement holes is associated with one of the plurality of pinless impingement areas and defines a central axis, and wherein the central axis is normal to the impingement surface and passes through the associated pinless impingement area.

5. The ring segment assembly of claim 4, wherein the central axis passes through a center of the associated pinless impingement area.

6. The ring segment assembly of claim 1, wherein the plurality of bumps and the plurality of valleys are arranged in an array having a plurality of rows and a plurality of columns, and wherein the plurality of bumps and the plurality of valleys alternate with each other in each row of the plurality of rows and each column of the plurality of columns.

7. The ring segment assembly of claim 6, wherein the plurality of impingement holes are arranged in every other row of the plurality of rows and in every other column of the plurality of columns.

8. The ring segment assembly of claim 1, wherein the plurality of pins are arranged in an array having a plurality of rows and a plurality of columns, and wherein the plurality of pins in adjacent rows and columns are offset with one another defining a staggered arrangement.

9. The ring segment assembly of claim 1, further comprising a plurality of struts extending between and in contact with each of the impingement surface and the impingement plate and operable to maintain the non-zero distance therebetween.

10. A ring segment assembly comprising:

a ring segment comprising an impingement pocket having an impingement surface;

a plurality of pins extending from the impingement surface; and an impingement plate spaced a non-zero distance from the impingement surface, the impingement plate having a plurality of bumps and a plurality of valleys arranged in an array having a plurality of rows and a plurality of columns, each bump of the plurality of bumps and each valley of the plurality of valleys alternating with each other in each row of the plurality of rows and each column of the plurality of columns, the impingement plate defining a plurality of impingement holes, each impingement hole of the plurality of impingement holes formed in one of the valleys of the plurality of valleys.

11. The ring segment assembly of claim 10, wherein the impingement plate defines a negative Poisson's Ratio structure and is fixedly connected to the ring segment.

12. The ring segment assembly of claim 10, wherein the plurality of pins are arranged to define a plurality of pinless impingement areas.

13. The ring segment assembly of claim 12, wherein a portion of the plurality of pinless impingement areas comprises a hexagonal shape, wherein a remaining portion of the plurality of pinless impingement areas has a parallelogram shape.

14. The ring segment assembly of claim 13, wherein the plurality of pinless impingement areas are arranged in an array having a plurality of rows and a plurality of columns, and wherein the plurality of pinless impingement areas having the hexagonal shape alternate with the plurality of pinless impingement areas having the parallelogram shape in each row of the plurality of rows and each column of the plurality of columns.

15. The ring segment assembly of claim 12, wherein each impingement hole of the plurality impingement holes is associated with one of the plurality of pinless impingement areas and defines a central axis, and wherein the central axis is normal to the impingement surface and passes through the associated pinless impingement area.

16. The ring segment assembly of claim 15, wherein the central axis passes through a center of the associated pinless impingement area.

17. The ring segment assembly of claim 10, wherein the plurality of impingement holes are arranged in every other row of the plurality of rows and in every other column of the plurality of columns.

18. The ring segment assembly of claim 10, wherein the plurality of pins are arranged in an array having a plurality of rows and a plurality of columns, and wherein the plurality of pins in adjacent rows and columns are offset with one another defining a staggered arrangement.

19. The ring segments of claim 10, further comprising a plurality of struts extending between and in contact with each of the impingement surface and the impingement plate and operable to maintain the non-zero distance therebetween.

* * * * *